(12) United States Patent
Shamir

(10) Patent No.: US 6,507,913 B1
(45) Date of Patent: Jan. 14, 2003

(54) PROTECTING SMART CARDS FROM POWER ANALYSIS WITH DETACHABLE POWER SUPPLIES

(75) Inventor: Adi Shamir, Rehovot (IL)

(73) Assignee: Yeda Research and Development Co. Ltd., Rehovot (IL)

( * ) Notice: Subject to any disclaimer, the term of this patent is extended or adjusted under 35 U.S.C. 154(b) by 0 days.

(21) Appl. No.: 09/475,921

(22) Filed: Dec. 30, 1999

(51) Int. Cl.$^7$ ............................. H04L 9/00; G06F 1/26
(52) U.S. Cl. ........................................ 713/200; 713/300
(58) Field of Search ............................. 713/182–185, 713/189, 194, 210, 300, 310

(56) References Cited

U.S. PATENT DOCUMENTS 4,575,621 A * 3/1986 Dreifus ........................ 235/380
6,275,681 B1 * 8/2001 Vega et al. ..................... 455/41

* cited by examiner

*Primary Examiner*—Thomas M. Heckler
(74) *Attorney, Agent, or Firm*—Martin Fleit; Paul D. Bianco; Fleit Kain Gibbons Gutman & Bongini

(57) ABSTRACT

A method and apparatus for protecting smart cards against simple and differential power attacks when they are inserted into card readers controlled by other entities. The technique is particularly useful in financial applications such as ATM cards, credit cards, and electronic wallets, in which cards have to be inserted into card readers which may be specifically manufactured or modified to perform undetectable measurements of the power supplied to the card during its normal operation. The basic technique is to use two capacitors embedded in the smart card in such a way that at any given time one of them is charged by the external power supply and the other one is discharged by powering the smart card chip. The roles of the two capacitors alternate rapidly, and the power supply is detached from the smart card chip in the sense that external power measurements do not reveal information about its internal operations.

27 Claims, 1 Drawing Sheet

PROTECTING SMART CARDS FROM POWER ANALYSIS WITH DETACHABLE POWER SUPPLIES

BACKGROUND OF INVENTION

1. Field of Invention

The present invention relates to novel techniques, methods, and apparatus for protecting smart cards from power analysis when they are inserted into a card reader controlled by an adversary.

2. Prior Art

Smart cards are typically used to carry out cryptographic computations based on secret keys embedded in their non-volatile memories. A large number of attacks on smart cards had been published in the scientific literature. Some of these attacks, e.g., fault attacks, as described by D. Boneh, R. A. Demillo and R. J. Lipton, "On the Importance of Checking Cryptographic Protocols for Faults" Proceedings of Eurocrypt 97, Springer-Verlag, 1997, pp 37–51, and probing attacks as described by O. Kommerling and M. Kuhn, "Design Principles for Tamper Resistant Smartcard Processors" http://www.cl.cam.ac.uk/~mgk25/sc99-tamper[-slides].pdf require sophisticated equipment and detailed knowhow of the physical design of the smart card chip. Other attacks, e.g., timing attacks, as described by P. Kocher, "Timing Attacks on Implementations of Diffie-Hellman, RSA, DSS, and Other Systems" Proceedings of Crypto 96, Springer-Verlag, 1996, pp 104–113, and glitch attacks as described by O. Kommerling and M. Kuhn, "Design Principles for Tamper Resistant Smartcard Processors" Proceedings of USENIX Workshop on Smartcard Technology, USENIX Association, pp. 9–20, 1999, can be carried out with a very small investment, but it is relatively easy to protect the software and hardware elements in the smart cards against them.

In 1998 Paul Kocher from Cryptography Research published a new type of attack called Power Analysis, as described by P. Kocher, J. Jaffe, and B. Jun, "Introduction of Differential Power Analysis and Related Attacks" http://www.cryptography.com/dpa/technical/Index.html, 1998, which is very easy to implement, but very difficult to avoid. The attack is based on the analysis of the precise power consumption curve of the smart card during the cryptographic operations. In the Simple Power Analysis (SPA) variant of this attack, the attacker studies a single power consumption curve and determines (among other things) the identity of the instructions and the Hamming weight of data words read from or written into memory at any given clock cycle. In the Differential Power Analysis (DPA) variant of this attack, the attacker studies multiple power consumption curves recorded from different executions with different inputs, and looks for statistical differences between particular subsets of executions which are correlated with particular key bits. Mr. Kocher had stated that with this technique he managed to break essentially all the smart card systems deployed by financial institutions, telephone and satellite companies, governments, etc.

One of the most worrisome aspects of power analysis is that it can be carried out in a completely undetectable way. Many types of personal smart cards are used by inserting them into smart card readers controlled by possibly dishonest entities: An ATM card can be used to withdraw cash from a foreign machine operated by an unfamiliar financial institution, a credit card can be used to pay for merchandise in a mafia-affiliated store, and a mondex-like card can be used to transfer money to a purse owned by a dishonest taxi driver. In all these cases, smart cards which will not be returned (or returned with an obvious damage due to fault or probing attacks) will be immediately reported. However, power analysis can be carried out without leaving any detectable trace whenever the card is used. The result of such an attack is likely to be the creation of duplicate cards or the generation of unrelated payments, which will be very difficult to avoid.

Power attacks are based on the observation that the detailed power curve of a typical smart card (which describes the externally supplied current changes over time) contains a huge amount of information about its secret contents. It is easy to see the exact sequence of events (in the form of individual gates which switch on or off) during the execution of each instruction. For example, the power consumption curves of the addition and multiplication operations have completely different shapes, and the total power consumed by writing 0..0 and 1..1 to memory are noticably different. In fact, it is possible to visually extract the secret key of an RSA operation on a typical smart card just by looking at the power consumption curve, and determining which parts look like a modular squaring and which parts look like a modular multiplication.

DESCRIPTION OF PRIOR ART PROTECTIVE TECHNIQUES

After the publication of Kocher's SPA/DPA techniques, researchers and smart card manufacturers started looking for solutions. Attempts to make the power consumed by smart cards absolutely uniform by changing their physical design failed, since even small nonuniformity in the power consumption curve could be captured by sensitive digital oscilloscopes and analysed to reveal useful information. In addition, forcing all the instructions to switch the same number of gates on or off at the same points in time is a very unnatural requirement, which increases the area and total power consumption of the microprocessor, slows it down, and makes it more vulnerable to other types of attack.

Another proposed solution was to use a capacitor across the power supply lines to smooth the power consumption curve. However, physical limitations restricted the size of the capacitor, and enough nonuniformity was left in the power consumption curve to make this a very partial solution, especially against DPA.

Other proposed techniques include software-based randomization techniques, hardware-based random noise generators, unusual instructions, parallel execution of several instructions, etc. However, randomized software does not help if the attacker can follow individual instructions, and hardware noise can be eliminated by averaging multiple power consumption curves, and thus they provide only limited protection against a determined attacker with sensitive measuring devices.

A different solution is to replace the external power supply by an internal battery on the smart card. If the power pads on the smart card are not connected to the chip, the power consumption cannot be externally measured by the card reader when it communicates with the card. However, the width or thickness of a typical smart card is just 0.76 mm. Since such thin batteries are expensive, last a very shot time, and are difficult to replace, this is not a practical solution.

An alternative solution is to use a rechargeable battery in each smart card. Such a battery can be charged by the external power supply whenever the card is inserted into a card reader, and thus, one does not have to replace it so often. However, thin rechargeable batteries drain quickly even when they are not in use, and thus, in normal intermittent use there is an unacceptably long charging delay before one can start powering the card from its internal battery. In addition, typical rechargeable batteries deteriorate after several hundred charging cycles, and thus, the card has to be replaced after a relatively small number of intermittent transactions.

SUMMARY OF THE INVENTION

According to the present invention, a novel apparatus and method is employed for isolating the power supplied to the card from the power consumed by the card, by using a different kind of separating element between them. The basic idea is to use one or more capacitors in such a way that during at least part of the computation the smart card chip receives its power from a discharging capacitor contained in the smart card, and during some different part of the computation the external power supply charges this capacitor. In this way the power supply curve will only describe the charging process of each capacitor, and not the actual power consumption curve of the smart card chip. The switchover can be triggered either by the voltage of the discharging capacitor falling below a predetermined threshold, or by counting a certain number of instructions, or by a combination of these factors. This detachment can be limited to security critical computations such as the evaluation of cryptographic functions, or used continuously whenever the smart card is inserted into the card reader.

In one preferred design of the invention, the capacitors are built directly into the smart card chip. With careful design, they can be placed as extra metalic layers over the chip. Any tampering with these capacitors is likely to destroy the chip and erase its memory. However, this would tend to require the capacitor to be very small, and could possibly complicate its manufacturing process. Alternatively, in another preferred design of the invention, standard flat capacitors are embedded in a small cavity in the plastic card next to the chip, or the capacitors are built over the full surface of the smart card by sandwiching several layers of plastic and aluminum in its 0.76 mm width. Such external constructions add just a few cents to the cost of the smart card, and provide excellent protection against undetectable power measurements during normal transactions. Note that these smart cards can still be subjected to power analysis by destroying their capacitors, but swallowed or damaged smart cards are likely to be reported by their owners and blacklisted by their issuers.

The capacitor approach has the following clear advantages over the battery approach:
1. Capacitors are smaller than batteries, and are easier to embedded on the chip or in the plastic card next to the chip.
2. Capacitors are cheaper than batteries, and cost just a few cents.
3. Capacitors can be recharged an unlimited number of times, while batteries deteriorate after several hundred charging cycles.
4. Capacitors do not have the memory effects of rechargeable batteries, and can be recharged without side effects even if they are not fully discharged.
5. Capacitors can be charged in a fraction of a second, and thus intermittent use is not a problem.
6. When alternatively charging and discharging capacitors, the average current consumed from the power supply is roughly equal to the average current consumed by the chip.

Standard card readers may be unable to supply the large initial current needed if one wanted to charge the battery during the first second, and then, use it to power the chip for ten seconds.

The only disadvantage of the capacitor approach is that it can supply power to the chip only for tens of microseconds before its voltage becomes too low. However, since capacitors can be repeatedly recharged from the external power supply, this is not a problem even if the overall computation takes much longer.

If an attacker tries to perform power analysis on the current supplied to the card, he will only see the standard exponential decay curve of a charging capacitor, and not the minute power fluctuations caused by the execution of instructions in the smart card chip. The only information he may infer is the total current consumed by all the chip operations during the discharging period, since this will affect the next charging period. For this reason, this period is made as large as possible, in order to minimize this residual leakage of information. A simple calculation shows that a standard 0.1 microfarad capacitor can supply the 5 milliamperes required by a typical smart card chip for a period of 20 microseconds with a voltage drop of just 1 volt (say, from 6 volts to 5 volts). At the standard clock rate of 5 megahertz, the chip performs about 100 instructions in 20 microseconds, and thus, the residual information which can be learned is the total power consumed by the chip during 100 consecutive operations, which is not very informative. To make it even less informative, the instructions and data used in such batches of 100 instructions can be carefully balanced, which is much easier than balancing the power consumed by the chip at all possible times during the execution of all the possible instructions. Alternatively, simple circuitry can be added to the chip which discharges the capacitor to some fixed voltage during a fixed time delay before connecting it to the external power supply as part of the switchover process. For example, the external power supply can charge the capacitor from 4.5 to 6 volts, the chip discharges it to 5±0.3 volts, and the switchover circuitry quickly discharged it to exactly 4.5 volts. In this case, external power measurements are useless, since the charging capacitors are always in exactly the same state regardless of the program executed or the data processed on the chip.

Other and further advantages and objects of the invention will become apparent from the following detailed description of preferred embodiments when taken with the appended drawings.

DETAILED DESCRIPTION OF PREFERRED EMBODIMENTS

Figure 1:
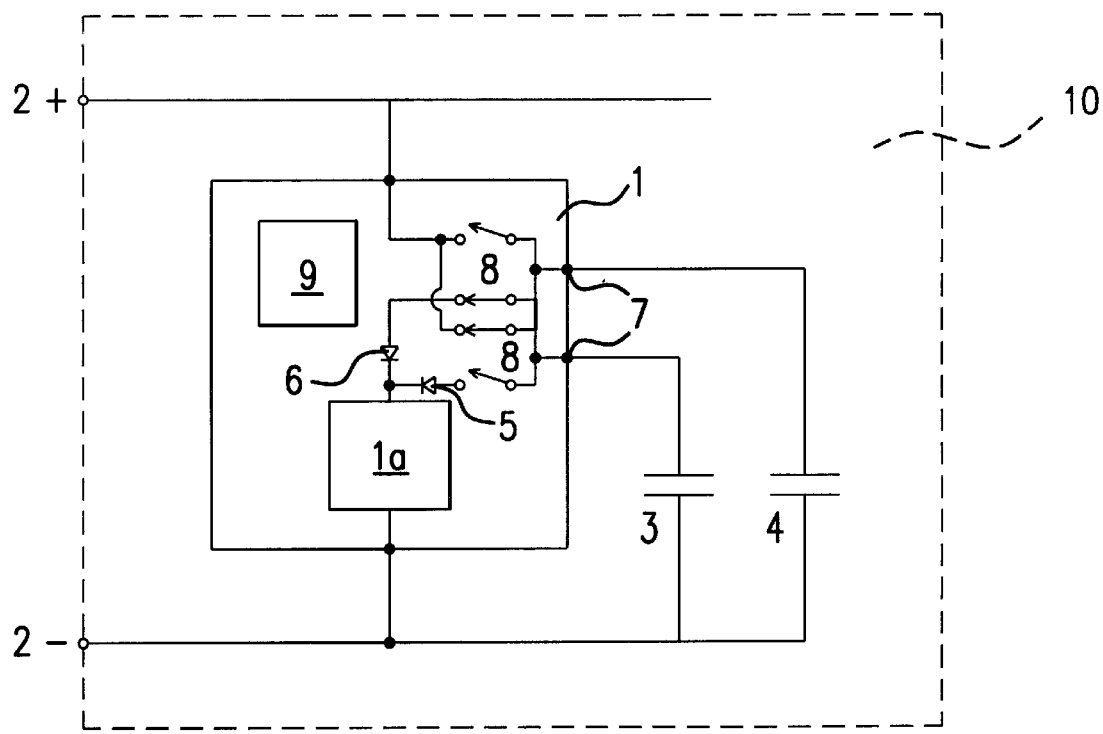
FIG. 1 is a schematic circuit diagram showing a smart card according to the invention using two capacitors.

Referring now to the drawings, preferred embodiments will now be described in detail. The first embodiment, described in FIG. 1, shows a smart card 10 which contains a smart card chip 1. The object of the first embodiment is to allow the smart card chip (denoted by 1) to operate continuously without being directly connected to the external power supply (denoted by 2) during all or part of its computation. It contains two capacitors (denoted by 3 and 4), which are connected to contacts (denoted by 7) on the smart card chip. These contacts 7 are connected via four power transistors (denoted as switches 8) which are controlled by switchover logic (denoted by 9), as described hereinafter, either to the external power supply (2) or via two diodes (denoted by 5 and 6) to the rest of the smart card chip (1).

In the preferred embodiment of the new invention the connections of the two capacitors alternate in a periodic way. During odd periods the first capacitor, either 3 or 4, is connected to power and the second capacitor, either 4 or 3 respectively, is connected to the chip, and during even periods the connections are reversed. The preferred sequence of actions of the power transistors which are controlled by the switchover logic is:
1. The first capacitor is disconnected from external power.
2. The first capacitor is connected to the chip.
3. The second capacitor is disconnected from the chip.
4. The second capacitor is connected to the external power.

With this sequence of actions the smart chard chip is always powered by at least one capacitor, but the external power supply is never connected directly to the smart card chip. The capacitors are connected via diodes to prevent leakage from the charged capacitor to the discharged capacitor during the brief moments in which they are connected in parallel to the chip.

Figure 2:
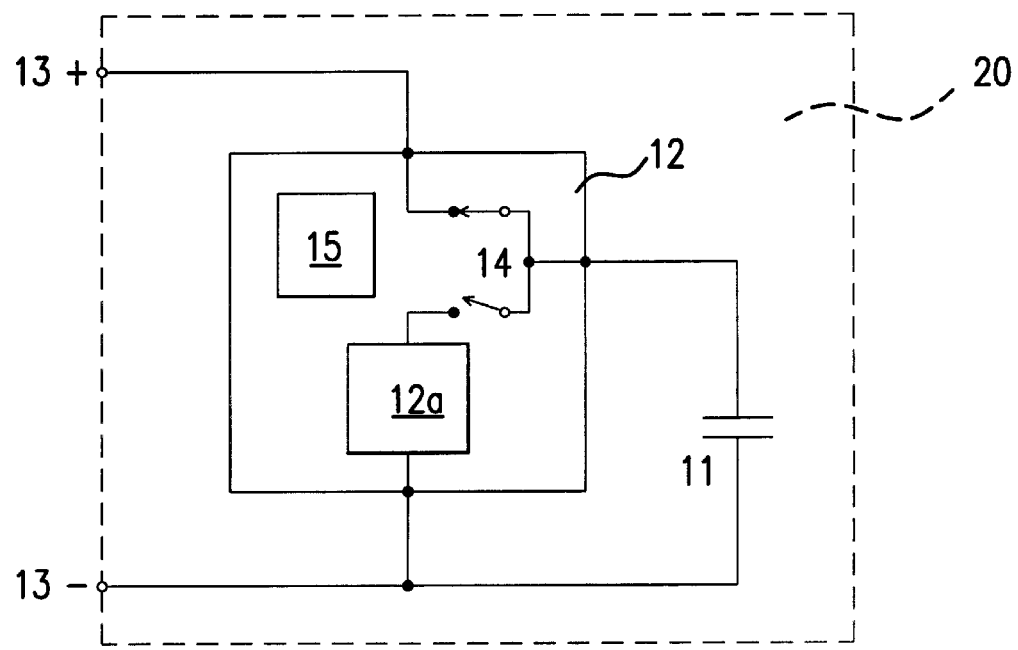
FIG. 2 is a schematic circuit diagram showing a smart card according to the invention using one capacitor.

Another preferred embodiment of the present invention is described in FIG. 2. It uses only one capacitor (11), which is alternately connected to the chip (12) of smart card (20) and to external power (13) by two power transistors (14) under the control of switchover logic (15). In this embodiment, the chip (12) has to be halted and disconnected from power after each discharging cycle, which slows down its operation, and could possibly cause problems with some types of volatile on-chip memories.

Although the present invention has been shown and described in terms of preferred embodiments, nevertheless changes and modifications will be evident to those skilled in the art from a knowledge of the disclosure and teachings herein. Such changes and modifications which do not depart from the teachings, scope and spirit of the present invention are deemed to fall within the purview of the invention as claimed.

What is claimed is:

1. A method of protecting a smart card including a smart card chip which performs computation from cryptanalytic attacks based on power analysis, in which during at least part of computation being performed, furnishing power to the smart card chip from a discharging capacitor contained in the smart card, and during some different part of the computation being performed, charging the capacitor from an external power supply.

2. The method of claim 1 in which the smart card chip is not directly connected to the external power supply at any time during computation.

3. The method of claim 1 in which the smart card chip is not directly connected to the external power supply when it processes secret data.

4. The method of claim 1 in which the smart card chip is not directly connected to the external power supply when it performs cryptographic computations.

5. The method of claim 1 in which the smart card contains one capacitor, which is alternately connected to the smart card chip and to the external power supply.

6. The method of claim 5 in which the smart card chip operates during those times it is connected to the capacitor, and halts during those times in which the capacitor is connected to the external power supply.

7. The method of claim 1 in which the smart card contains at least two capacitors, which are connected in such a way that at any given time one of the at least two capacitors is connected to the smart card chip and another of the at least two capacitors is connected to the external power supply.

8. The method of claim 7 in which the connections of the two capacitors are repeatedly reversed, and the smart card chip operates continuously.

9. The method of claim 7 in which the connections of the two capacitors are repeatedly reversed in a periodic way, and the smart card chip operates continuously.

10. The method of claim 1, in which the smart card contains at least three capacitors, which are connected in such a way that at any given time at least one of the at least three capacitors is connected to the smart card chip and at least one of the other at least three capacitors is connected to the external power supply.

11. A method comprising the steps of:
   a) powering a smart card including a chip for performing computations by a discharging capacitor connected to the chip while it is performing at least part of its computations,
   b) changing the connections to the capacitor to disconnect it from the chip and enable its charging, and
   c) charging the capacitor while it is disconnected from the chip.

12. The method of claim 11, in which the change of connection is triggered by the voltage across the capacitor exceeding or dropping below a certain threshold.

13. The method of claim 11, in which the change of connection is triggered by counting a number of clock cycles.

14. The method of claim 11, in which the change of connection is triggered by the voltage across the capacitor exceeding or dropping below a certain threshold at the beginning of a clock cycle.

15. The method of claim 11, in which additional circuitry on the smart card discharges the capacitor to a fixed voltage before connecting it to the external power supply as part of the switchover process.

16. Apparatus comprising:
   a) a smart card containing a smart card chip for performing calculations,
   b) a capacitor,
   c) contacts for connecting an external power supply to the capacitor, and
   d) switchover logic for alternately connecting the capacitor to power the smart card chip and to be charged by the external power supply.

17. Apparatus according to claim 16 wherein the smart card chip is not directly connected to the external power supply at any time during computation.

18. Apparatus according to claim 16 wherein the smart card chip is not directly connected to the external power supply when it processes secret data.

19. Apparatus according to claim 16 wherein the smart card chip is not directly connected to the external power supply when it performs cryptographic computations.

20. Apparatus according to claim 16 wherein the smart card contains one capacitor, which is alternately connected to the smart card chip and to the external power supply.

21. Apparatus according to claim 16 wherein the smart card contains at least two capacitors, which are connected in such a way that at any given time one of the at least two capacitors is connected to the smart card chip and another of the at least two capacitors is connected to the external power supply.

22. Apparatus according to claim 21 wherein the switchover logic is such that the connections of the two capacitors are repeatedly reversed, and the smart card chip operates continuously.

23. Apparatus according to claim 16 wherein the switchover logic is such that the change of connection is triggered by the voltage across the capacitor exceeding or dropping below a certain threshold.

24. Apparatus according to claim 16 wherein the switchover logic is such that the change of connection is triggered by counting a number of clock cycles.

25. Apparatus according to claim 16 wherein the switchover logic is such that the smart card discharges the capacitor to a fixed voltage before connecting it to the external power supply as part of the switchover process.

26. Apparatus according to claim 16 wherein the switchover logic is such that the change of connection is triggered by the voltage across the capacitor exceeding or dropping below a certain threshold at the beginning of a clock cycle.

27. Apparatus according to claim 16 wherein the smart card contains at least three capacitors, which are connected in such a way that at any given time one of the at least three capacitors is connected to the smart card chip and another of the at least three capacitors is connected to the external power supply.

* * * * *